United States Patent
Inokuchi

(10) Patent No.: US 11,549,015 B2
(45) Date of Patent: Jan. 10, 2023

(54) SILICONE EMULSION COMPOSITION FOR FORMING RUBBER COATING FILM, AND METHOD FOR MANUFACTURING SAME

(71) Applicant: SHIN-ETSU CHEMICAL CO., LTD., Tokyo (JP)

(72) Inventor: Yoshinori Inokuchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 353 days.

(21) Appl. No.: 16/628,438

(22) PCT Filed: Jun. 13, 2018

(86) PCT No.: PCT/JP2018/022516
§ 371 (c)(1),
(2) Date: Jan. 3, 2020

(87) PCT Pub. No.: WO2019/012899
PCT Pub. Date: Jan. 17, 2019

(65) Prior Publication Data
US 2020/0165454 A1 May 28, 2020

(30) Foreign Application Priority Data
Jul. 14, 2017 (JP) .............................. JP2017-137596

(51) Int. Cl.
| | | |
|---|---|---|
| C08L 83/04 | (2006.01) | |
| C08G 77/16 | (2006.01) | |
| C08G 77/20 | (2006.01) | |
| C08G 77/26 | (2006.01) | |
| C08K 5/42 | (2006.01) | |

(52) U.S. Cl.
CPC .............. *C08L 83/04* (2013.01); *C08G 77/16* (2013.01); *C08G 77/20* (2013.01); *C08G 77/26* (2013.01); *C08K 5/42* (2013.01); *C08L 2203/16* (2013.01)

(58) Field of Classification Search
CPC ..... C08L 83/04; C08L 2203/16; C08G 77/16; C08G 77/20; C08G 77/26; C08K 5/42
USPC ....................................................... 524/837
See application file for complete search history.

(56) References Cited

U.S. PATENT DOCUMENTS

| | | | |
|---|---|---|---|
| 3,098,833 A | | 7/1963 | Solomon et al. |
| 3,294,725 A | | 12/1966 | Findlay et al. |
| 3,900,617 A | | 8/1975 | Grenoble |
| 4,228,054 A | | 10/1980 | Ona et al. |
| 4,496,687 A | | 1/1985 | Okada et al. |
| 5,851,594 A | * | 12/1998 | Feder ......................... C08J 3/03 523/322 |
| 5,985,994 A | * | 11/1999 | Oberneder ........... C09K 3/1018 528/901 |

FOREIGN PATENT DOCUMENTS

| | | |
|---|---|---|
| EP | 0 640 670 A2 | 3/1995 |
| EP | 2 130 883 A2 | 12/2009 |
| GB | 1 599 209 A | 9/1981 |
| JP | 38-860 B | 2/1963 |
| JP | 50-94062 A | 7/1975 |
| JP | 53-130752 A | 11/1978 |
| JP | 54-52160 A | 4/1979 |
| JP | 54-131661 A | 10/1979 |
| JP | 58-101153 A | 6/1983 |
| JP | 6-73291 A | 3/1994 |
| JP | 7-196920 A | 8/1995 |
| JP | 7-196984 A | 8/1995 |
| JP | 8-504845 A | 5/1996 |
| JP | 10-506674 A | 6/1998 |
| JP | 2002-363494 A | 12/2002 |
| JP | 2005-306994 A | 11/2005 |
| JP | 2009-292254 A | 12/2009 |
| JP | 2010-59663 A | 3/2010 |
| JP | 2016-79303 A | 5/2016 |

OTHER PUBLICATIONS

International Search Report (PCT/ISA/210) issued in PCT/JP2018/022516, dated Sep. 11, 2018.
Written Opinion (PCT/ISA/237) issued in PCT/JP2018/022516, dated Sep. 11, 2018.

* cited by examiner

*Primary Examiner* — Kelechi C Egwim
(74) *Attorney, Agent, or Firm* — Birch, Stewart, Kolasch & Birch, LLP

(57) ABSTRACT

The silicone emulsion composition for forming a rubber coating film according to the present invention, including
(A) an organopolysiloxane having at least two hydroxyl groups bonded to silicon atoms at terminal ends of the molecule in each molecule thereof,
(B) an aminoalkyltrialkoxysilane represented by formula (1)

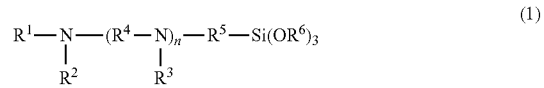

(where $R^1$ through $R^3$ represent H or a univalent hydrocarbon group, $R^4$ and $R^5$ represent divalent hydrocarbon groups, $R^6$ represents a univalent hydrocarbon group, and n is an integer 0 to 6),
(C) a vinyltrialkoxysilane represented by formula (2):

$$CH_2=CHSi(OR^7)_3$$

(where $R^7$ represents a univalent hydrocarbon group),
(D) a surfactant, and
(E) water
and not containing an organic tin compound, is free of problems with storage stability or byproducts, and a rubber coating film can be formed thereby in a short time without the use of an organic tin compound.

11 Claims, No Drawings

SILICONE EMULSION COMPOSITION FOR FORMING RUBBER COATING FILM, AND METHOD FOR MANUFACTURING SAME

TECHNICAL FIELD

This invention relates to a silicone emulsion composition which is useful as a coating agent or coating agent raw material for forming a rubber film upon room temperature drying or heat treatment, and a method for preparing the same.

BACKGROUND ART

A variety of compositions for silicone emulsions adapted to form rubber films upon drying are known in the art. They are used as textile treating agents, rubber coating agents, building member coating agents, paper or plastic sheet coating agents or additives thereto for the purposes of imparting slipping, water repellent or parting properties.

One method of forming rubber film is by effecting addition reaction of alkenylsilyl groups and hydrosilyl groups at the same time as drying to form a silicone elastomer film. As the composition suited for such method, Patent Document 1: JP-A S50-94082 discloses an emulsion composition comprising a diorganopolysiloxane blocked with vinyl at molecular chain ends, an organohydrogenpolysiloxane, and a platinum catalyst, and Patent Document 2: JP-A S54-52160 proposes an emulsion composition comprising a diorganopolysiloxane containing vinyl at molecular chain ends or side chains, a polysiloxane containing silicon-bonded hydrogen, colloidal silica, and a platinum catalyst. In these compositions, however, reaction can take place or hydrogen gas be released with a lapse of time if the hydrosilyl-containing siloxane and the platinum catalyst are co-present. This necessitates to mix the silicone emulsion with the platinum catalyst immediately before use, indicating inconvenience of use. There is another drawback that the compositions will not cure to a full extent if substrates to be coated therewith contain addition reaction-inhibiting compounds such as amine, tin, phosphorus or sulfur-containing compounds.

Also known is a method of forwarding condensation reaction of silicone at the same time as drying. As the composition suited for such method, Patent Document 3: U.S. Pat. No. 3,098,833 discloses an emulsion composition comprising a hydroxylated diorganopolysiloxane, a polysiloxane containing silicon-bonded hydrogen, and a curing catalyst; Patent Document 4: JP-B S38-860 discloses an emulsion composition comprising a diorganopolysiloxane blocked with hydroxyl at both molecular chain ends, organohydrogenpolysiloxane, polyalkyl silicate, and a tin salt of fatty acid; Patent Document 5: JP-A S53-130752 discloses an emulsion composition comprising a diorganopolysiloxane blocked with hydroxyl at both molecular chain ends, a silane containing at least 3 hydrolyzable groups, and a curing catalyst; Patent Document 6: U.S. Pat. No. 3,294,725 discloses an emulsion composition comprising a hydroxylated diorganopolysiloxane, a trialkoxysilane, and colloidal silica; Patent Document 7: JP-A S54-131661 discloses an organopolysiloxane latex composition obtained from emulsion polymerization of cyclic organosiloxane and organotrialkoxysilane; Patent Document 8: JP-A S58-101153 discloses an emulsion composition comprising a hydroxyl-containing organopolysiloxane, the reaction product of amino-functional silane with acid anhydride, colloidal silica, and a curing catalyst; Patent Document 9: JP-A H07-196984 discloses a silicone emulsion composition obtained by mixing and dispersing an emulsion of amino-containing organopolysiloxane and an epoxy-containing hydrolyzable silane, or a silicone emulsion composition obtained by mixing and dispersing an emulsion of epoxy-containing organopolysiloxane and an amino-containing hydrolyzable silane. In these compositions adapted to cure through condensation reaction, organotin compounds having high catalytic activity must be used in order to form a fully cured rubber film within a short time. Nowadays, the use of tin compounds is avoided from the aspect of toxicity.

Patent Document 10: JP-A H06-73291 proposes a composition obtained by emulsifying a mixture of a hydroxyl-containing organopolysiloxane and an aminoxy-containing siloxane and/or silane. This composition does not need a condensation catalyst in forming a cured film, but raises the problem that an amino compound is by-produced during condensation reaction.

Patent Document 11: JP-A 2005-306994 proposes a silicone emulsion composition comprising an organopolysiloxane having a silicon-bonded hydroxyl and/or alkoxy group and an amino-containing alkyl group at molecular chain ends, a trialkoxysilane or tetraalkoxysilane, and a metal compound. From this composition, a fully cured rubber film can be formed through brief condensation reaction without using tin compounds. However, the composition cannot be stored for a long term because the organopolysiloxane on which the composition is based polymerizes gradually with a lapse of time to build up its molecular weight. Also, since the organopolysiloxane emulsion in the composition cannot be prepared by emulsion polymerization, there is the problem that it cannot be an emulsion of organopolysiloxane having a high degree of polymerization.

PRIOR ART DOCUMENTS

Patent Documents

Patent Document 1: JP-A S50-94082
Patent Document 2: JP-A S54-52160
Patent Document 3: U.S. Pat. No. 3,098,833
Patent Document 4: JP-B S38-860
Patent Document 5: JP-A S53-130752
Patent Document 6: U.S. Pat. No. 3,294,725
Patent Document 7: JP-A S54-131661
Patent Document 8: JP-A S58-101153
Patent Document 9: JP-A H07-196984
Patent Document 10: JP-A H06-73291
Patent Document 11: JP-A 2005-306994

SUMMARY OF INVENTION

Technical Problem

An object of the invention, which has been made under the above-mentioned circumstances, is to provide a rubber film-forming silicone emulsion composition which eliminates the problems of storage stability and by-products and can form a rubber film within a short time without using organotin compounds, and a method for preparing the same.

Solution to Problem

Making extensive investigations to attain the above object, the inventor has found that when an organopolysiloxane containing per molecule at least two hydroxyl groups bonded to silicon atoms at molecular ends is combined with an aminoalkyltrialkoxysilane and vinyltrialkoxysilane, especially a mixed/dissolved liquid of aminoalkyltrialkoxysilane and vinyltrialkoxysilane, as a crosslinker, there is obtained a silicone emulsion composition adapted to form a rubber film within a short time without using organotin compounds. The invention is predicated on this finding.

Accordingly, the invention provides a rubber film-forming silicone emulsion composition and a method for preparing the same, as defined below.

A rubber film-forming silicone emulsion composition comprising:

(A) 100 parts by weight of an organopolysiloxane containing per molecule at least two hydroxyl groups bonded to silicon atoms at molecular ends, (B) 0.1 to 5 parts by weight of an aminoalkyltrialkoxysilane having the general formula (1):

[Chem. 1]

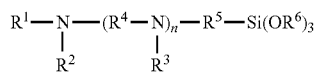
(1)

wherein $R^1$, $R^2$ and $R^3$ are hydrogen or a substituted or unsubstituted $C_1$-$C_{10}$ monovalent hydrocarbon group, $R^4$ is a $C_1$-$C_4$ divalent hydrocarbon group, $R^5$ is a substituted or unsubstituted $C_1$-$C_6$ divalent hydrocarbon group, $R^6$ is a $C_1$-$C_6$ monovalent hydrocarbon group, and n is an integer of 0 to 6, (C) a vinyltrialkoxysilane having the general formula (2):

(2)

wherein $R^7$ is a $C_1$-$C_6$ monovalent hydrocarbon group, in an amount of 0.1 to 50 parts by weight which is at least equal to the amount of component (B), (D) 0.1 to 20 parts by weight of a surfactant, and (E) 40 to 1,000 parts by weight of water, the composition being free of organotin compounds.

The silicone emulsion composition of [1] wherein component (B) is an aminoalkyltriethoxysilane having the general formula (3):

[Chem. 2]

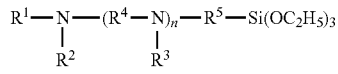
(3)

wherein $R^1$, $R^2$ and $R^3$ are hydrogen or a substituted or unsubstituted $C_1$-$C_{10}$ monovalent hydrocarbon group, $R^4$ is a $C_1$-$C_4$ divalent hydrocarbon group, $R^5$ is a substituted or unsubstituted $C_1$-$C_6$ divalent hydrocarbon group, and n is an integer of 0 to 6.

The silicone emulsion composition of [1] or [2] wherein component (C) is vinyltriethoxysilane having the formula:

The silicone emulsion composition of any one of [1] to [3] wherein component (B) is in the form of a mixed/dissolved liquid obtained by previously mixing and dissolving the entirety of component (B) in a portion or the entirety of component (C), the amount of component (C) being at least equal to the amount of component (B).

A method for preparing a rubber film-forming silicone emulsion composition, comprising the steps of:

mixing and dissolving the entire amount of (B) an aminoalkyltrialkoxysilane having the general formula (1):

[Chem. 3]

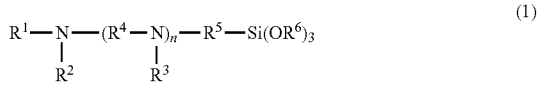
(1)

wherein $R^1$, $R^2$ and $R^3$ are hydrogen or a substituted or unsubstituted $C_1$-$C_{10}$ monovalent hydrocarbon group, $R^4$ is a $C_1$-$C_4$ divalent hydrocarbon group, $R^5$ is a substituted or unsubstituted $C_1$-$C_6$ divalent hydrocarbon group, $R^6$ is a $C_1$-$C_6$ monovalent hydrocarbon group, and n is an integer of 0 to 6, in an equal or more amount of (C) a vinyltrialkoxysilane having the general formula (2):

(2)

wherein $R^7$ is a $C_1$-$C_6$ monovalent hydrocarbon group, to form a mixed/dissolved liquid, and with stirring, adding and mixing the mixed/dissolved liquid or the mixed/dissolved liquid and the remainder of component (C) if the mixed/dissolved liquid does not contain the entire amount of component (C), with an emulsion consisting of (A) an organopolysiloxane containing per molecule at least two hydroxyl groups bonded to silicon atoms at molecular ends, (D) a surfactant, and (E) water.

The method of [5] wherein the emulsion is obtained by emulsifying organopolysiloxane (A) in water (E) with the aid of surfactant (D), and with stirring, the mixed/dissolved liquid of aminoalkyltrialkoxysilane (B) and vinyltrialkoxysilane (C) or the mixed/dissolved liquid and the remainder of component (C) if the mixed/dissolved liquid does not contain the entire amount of component (C), are added to and mixed with the emulsion.

The method of [5] wherein the emulsion is obtained by emulsifying a siloxane as a starting reactant to organopolysiloxane (A) in water (E) with the aid of surfactant (D) and emulsion polymerizing the siloxane into organopolysiloxane (A), and with stirring, the mixed/dissolved liquid of aminoalkyltrialkoxysilane (B) and vinyltrialkoxysilane (C) or the mixed/dissolved liquid and the remainder of component (C) if the mixed/dissolved liquid does not contain the entire amount of component (C), are added to and mixed with the emulsion.

The method of any one of [5] to [7] wherein component (B) is 0.1 to 5 parts by weight, component (C) is 0.1 to 50 parts by weight and at least equal to the amount of component (B), component (D) is 0.1 to 20 parts by weight, component (E) is 40 to 1,000 parts by weight, per 100 parts by weight of component (A), and the composition is free of organotin compounds.

The method of any one of [5] to [8] wherein component (B) is an aminoalkyltriethoxysilane having the general formula (3):

[Chem. 4]

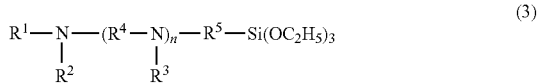
(3)

wherein $R^1$, $R^2$ and $R^3$ are hydrogen or a substituted or unsubstituted $C_1$-$C_{10}$ monovalent hydrocarbon group, $R^4$ is a $C_1$-$C_4$ divalent hydrocarbon group, $R^5$ is a substituted or unsubstituted $C_1$-$C_6$ divalent hydrocarbon group, and n is an integer of 0 to 6.

The method of any one of [5] to [9] wherein component (C) is vinyltriethoxysilane having the formula:

$CH_2$=$CHSi(OC_2H_5)_3$.

Advantageous Effects of Invention

The invention provides a rubber film-forming crosslinkable silicone emulsion composition adapted to form a cured rubber film on room temperature drying or heat treatment. The composition is useful as coating agents or coating agent raw materials. Any concern about toxicity and environmental impact is eliminated because no organotin compounds are contained.

DESCRIPTION OF EMBODIMENTS

Component (A) used herein is an organopolysiloxane having per molecule at least 2, preferably 2 to 10 hydroxyl groups bonded to silicon atoms at molecular ends, more preferably having hydroxyl groups at all molecular ends. The preferred organopolysiloxane as component (A) has the average compositional formula (4).

$$R^8{}_a(OH)_b SiO_{(4-a-b)/2} \quad (4)$$

Herein $R^8$ is independently a substituted or unsubstituted $C_1$-$C_{30}$ monovalent hydrocarbon group, a and b are positive numbers in the range: 0≤a<3, 0<b≤3, and 0.1≤a+b≤3, preferably 0≤a≤2.295, 0.005<b≤2.3, and 0.5≤a+b≤2.3.

In formula (4), $R^8$ is a substituted or unsubstituted $C_1$-$C_{30}$, preferably $C_1$-$C_6$ monovalent hydrocarbon group, examples of which include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, tetrasyl, and triacontyl, alkenyl groups such as vinyl and allyl, aryl groups such as phenyl, tolyl and naphthyl, aralkyl groups such as benzyl and phenethyl, cycloalkyl groups such as cyclopentyl, cyclohexyl and cycloheptyl, and substituted monovalent hydrocarbon groups in which some or all of the carbon-bonded hydrogen atoms are substituted by atoms such as halogen atoms (e.g., fluorine, chlorine, bromine and iodine) and/or substituents such as acryloyloxy, methacryloyloxy, epoxy, glycidoxy, amino, and carboxyl. In particular, it is industrially preferred that methyl account for at least 50 mol % of all groups $R^8$.

The structure of component (A) may be linear, branched or cyclic. Examples of component (A) of linear structure include those having the following formula.

[Chem. 5]

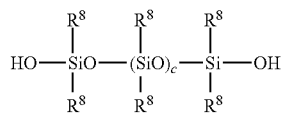

Herein $R^8$ is as defined above, and c is a positive number of 10 to 2,000.

Examples of component (A) of branched structure include those branching from $R^8SiO_{3/2}$ unit, as represented by the following formula.

[Chem. 6]

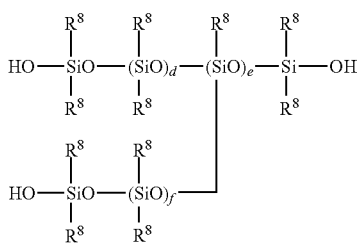

Herein $R^8$ is as defined above, d is a positive number of 10 to 2,000, e is a positive number of 1 to 20, and f is a positive number of 10 to 2,000.

Examples of component (A) of branched structure also include those branching from $SiO_{4/2}$ unit, as represented by the following formula.

[Chem. 7]

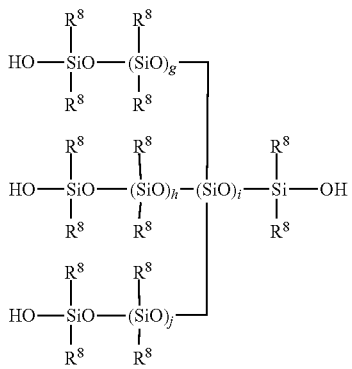

Herein $R^8$ is as defined above, g is a positive number of 10 to 2,000, h is a positive number of 10 to 2,000, i is a positive number of 1 to 20, and j is a positive number of 10 to 2,000.

The organopolysiloxane as component (A) has a viscosity which is preferably at least 100 mPa·s as measured at 25° C. by a rotational viscometer, though not particularly limited. If the viscosity is too high to measure directly by a rotational viscometer, a 5 wt % toluene solution of the organopolysiloxane should preferably have a viscosity of up to 1,000 mPa·s as measured at 25° C. by a rotational viscometer.

Component (A), organopolysiloxane having per molecule at least 2 hydroxyl groups bonded to silicon atoms at molecular ends may be synthesized by any well-known methods, for example, by effecting equilibration reaction of a cyclooligosiloxane having the formula: $[R^8{}_2SiO]_k$ wherein $R^8$ is as defined above and k is an integer of 3 to 7 in water in the presence of an acidic catalyst or alkaline catalyst. The organopolysiloxane resulting from this method is of linear structure. An organopolysiloxane of branched structure may be synthesized by effecting equilibration reaction of the cyclooligosiloxane and a trialkoxysilane having the formula: $R^8Si(OR^9)_3$ wherein $R^8$ is as defined above and $R^9$ is a $C_1$-$C_6$ monovalent hydrocarbon group or a tetraalkoxysilane having the formula: $Si(OR^{10})_4$ wherein $R^{10}$ is a $C_1$-$C_6$ monovalent hydrocarbon group in water.

Examples of the $C_1$-$C_6$ monovalent hydrocarbon groups represented by $R^9$ and $R^{10}$ include alkyl groups such as methyl, ethyl, propyl, isopropyl, butyl, tert-butyl, pentyl, and hexyl.

In the practice of the invention, the organopolysiloxane as component (A) should be in emulsion form. When component (A) has a high viscosity, it is difficult to form a stable emulsion, and thus an emulsion thereof is desirably prepared by the emulsion polymerization method to be described later.

Component (B) used herein is an aminoalkyltrialkoxysilane having the general formula (1).

[Chem. 8]

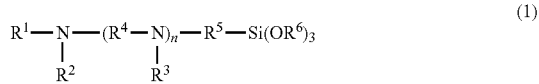

(1)

Herein $R^1$, $R^2$ and $R^3$ are hydrogen or a substituted or unsubstituted $C_1$-$C_{10}$ monovalent hydrocarbon group, $R^4$ is a $C_1$-$C_4$ divalent hydrocarbon group, $R^5$ is a substituted or unsubstituted $C_1$-$C_6$ divalent hydrocarbon group, $R^6$ is a $C_1$-$C_6$ monovalent hydrocarbon group, and n is an integer of 0 to 6, preferably 0.

In formula (1), $R^1$, $R^2$ and $R^3$ are hydrogen or a substituted or unsubstituted $C_1$-$C_{10}$, preferably $C_1$-$C_6$ monovalent hydrocarbon group. Examples include hydrogen; alkyl groups such as methyl, ethyl, propyl, isopropyl, butyl, tert-butyl, pentyl, hexyl, octyl, decyl, alkenyl groups such as vinyl and allyl, aryl groups such as phenyl, tolyl and naphthyl, aralkyl groups such as benzyl and phenethyl, cycloalkyl groups such as cyclopentyl, cyclohexyl and cycloheptyl, and substituted monovalent hydrocarbon groups in which some or all of the carbon-bonded hydrogen atoms are substituted by atoms such as halogen atoms (e.g., fluorine, chlorine, bromine and iodine). Inter alia, hydrogen and methyl are preferred, with hydrogen being most preferred.

$R^4$ is a $C_1$-$C_4$ divalent hydrocarbon group, examples of which include alkylene groups such as methylene, ethylene, trimethylene, and tetramethylene, with ethylene being preferred.

$R^5$ is a substituted or unsubstituted $C_1$-$C_6$, preferably $C_2$-$C_4$ divalent hydrocarbon group, examples of which include alkylene groups such as methylene, ethylene, trimethylene, tetramethylene, pentamethylene, and hexamethylene, arylene groups such as p-phenylene, and substituted divalent hydrocarbon groups in which some or all of the hydrogen atoms are substituted by atoms such as halogen atoms (e.g., fluorine, chlorine, bromine and iodine), such as 1-chlorotrimethylene. Inter alia, trimethylene is preferred.

$R^6$ is a $C_1$-$C_6$, preferably $C_1$-$C_3$ monovalent hydrocarbon group, examples of which include alkyl groups such as methyl, ethyl, propyl, isopropyl, butyl, tert-butyl, pentyl, and hexyl, with ethyl being preferred.

Preferred of the aminoalkyltrialkoxysilanes as component (B) are aminoalkyltriethoxysilanes having the general formula (3).

[Chem. 9]

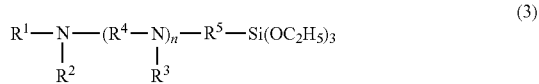

(3)

Herein $R^1$, $R^2$, $R^3$, $R^4$, $R^5$ and n are as defined above.

The amount of component (B) blended is 0.1 to 5 parts by weight, preferably 0.5 to 3 parts by weight per 100 parts by weight of the organopolysiloxane as component (A). With less than 0.1 part by weight of component (B), a fully cured film is not available. With more than 5 parts by weight of component (B), the emulsion loses stability.

Component (C) used herein is a vinyltrialkoxysilane having the general formula (2).

(2)

Herein $R^7$ is a $C_1$-$C_6$ monovalent hydrocarbon group.

In formula (2), $R^7$ is a $C_1$-$C_6$, preferably $C_1$-$C_3$ monovalent hydrocarbon group, examples of which include alkyl groups such as methyl, ethyl, propyl, isopropyl, butyl, tert-butyl, pentyl, and hexyl, with ethyl being preferred.

Preferred of the vinyltrialkoxysilanes as component (C) is vinyltriethoxysilane having the formula:

The amount of component (C) blended is 0.1 to 50 parts by weight, preferably 0.2 to 50 parts by weight, more preferably 0.5 to 30 parts by weight per 100 parts by weight of the organopolysiloxane as component (A), and at least equal to, preferably at least twice the amount by weight of component (B). If the amount of component (C) is less than 0.1 part by weight or more than 50 parts by weight per 100 parts by weight of component (A), a fully cured film is not available. If the amount of component (C) is less than the amount of component (B), the emulsion loses stability.

The aminoalkyltrialkoxysilane as component (B) and the vinyltrialkoxysilane as component (C) serve as crosslinkers for the organopolysiloxane having per molecule at least 2 hydroxyl groups bonded to silicon atoms at molecular ends as component (A) so that they may cure through condensation reaction into a silicone rubber. Although this condensation reaction is a condensation reaction between silicon-bonded hydroxyl groups in component (A) and alkoxy groups in component (B) and/or alkoxy groups in component (C), condensation reaction can also occur between alkoxy groups in component (B), between alkoxy groups in component (C), and between alkoxy groups in component (B) and alkoxy groups in component (C).

In the preferred procedure of the invention, components (B) and (C) are previously mixed into a mixed/dissolved liquid, which is added to and mixed with an emulsion consisting of the organopolysiloxane as component (A), the surfactant as component (D), and water as component (E). The mixed/dissolved liquid is preferably obtained by previously dissolving the entirety of component (B) in a portion or the entirety of component (C), the amount of component (C) being at least equal to the amount of component (B).

Component (D) used herein is a surfactant which serves as an emulsifier for emulsifying and dispersing components (A), (B) and (C) in water to form an emulsion composition.

The surfactant as component (D) is not particularly limited and may be any of anionic surfactants, nonionic surfactants, cationic surfactants, and ampholytic surfactants.

Examples of the anionic surfactant include alkyl sulfate salts such as sodium laurylsulfate, polyoxyethylene alkyl ether sulfate salts, polyoxyethylene alkyl phenyl ether sulfate salts, sulfate salts of fatty acid alkylolamides, alkyl benzene sulfonate salts, polyoxyethylene alkyl phenyl ether sulfonate salts, α-olefin sulfonate salts, α-sulfofatty acid ester salts, alkyl naphthalene sulfonic acid salts, alkyl diphenyl ether disulfonic acid salts, alkane sulfonic acid salts, N-acyltaurine acid salts, dialkyl sulfosuccinic acid salts, monoalkyl sulfosuccinic acid salts, polyoxyethylene alkyl ether sulfosuccinic acid salts, fatty acid salts, polyoxyethylene alkyl ether carboxylic acid salts, N-acylamino acid salts, monoalkylphosphate salts, dialkylphosphate salts, and polyoxyethylene alkyl ether phosphate salts.

Examples of the nonionic surfactant include polyoxyethylene alkyl ethers, polyoxyethylene polyoxypropylene alkyl ethers, polyoxyethylene alkyl phenyl ethers, polyethylene glycol fatty acid esters, polyoxyethylene sorbitan fatty acid esters, polyoxyethylene sorbitol fatty acid esters, polyoxyethylene glycerol fatty acid esters, polyglycerol fatty acid esters, propylene glycol fatty acid esters, polyoxyethylene castor oil, polyoxyethylene hydrogenated castor oil, polyoxyethylene hydrogenated castor oil fatty acid esters, polyoxyethylene alkyl amines, polyoxyethylene fatty acid amides, polyoxyethylene-modified organopolysiloxanes, and polyoxyethylene polyoxypropylene-modified organopolysiloxanes. The nonionic surfactant may be used alone or in a combination of two or more. When two or more surfactants are used in combination, a polyether-free nonionic surfactant such as sorbitan fatty acid ester or glycerol fatty acid ester may be used in combination.

Examples of the cationic surfactant include alkyltrimethylammonium salts, dialkyldimethylammonium salts, polyoxyethylene alkyl dimethylammonium salts, dipolyoxyethylene alkylmethylammonium salts, tripolyoxyethylene alkylammonium salts, alkylbenzyldimethylammonium salts, alkylpyridinium salts, monoalkylamine salts, and monoalkylamide amine salts.

Examples of the ampholytic surfactant include alkyldimethylamine oxides, alkyldimethylcarboxybetaine, alkylamidopropyldimethylcarboxybetaine, alkylhydroxysulfobetaine, and alkylcarboxymethyl hydroxyethyl imidazolinium betaine.

Although these surfactants may be used alone or in admixture, it is prohibited to use an anionic surfactant and a cationic surfactant in combination.

The amount of the surfactant blended as component (D) is 0.1 to 20 parts by weight, preferably 0.5 to 10 parts by weight per 100 parts by weight of the organopolysiloxane as component (A). If the amount of component (D) is less than 0.1 part by weight, a stable emulsion is not available. If the amount of component (D) is more than 20 parts by weight, the resulting film is non-stretchable and brittle.

Component (E) used herein is water which is a dispersing medium for the organopolysiloxane as component (A), the aminoalkyltrialkoxysilane as component (B), and the vinyltrialkoxysilane as component (C).

The amount of component (E) blended is 40 to 1,000 parts by weight, preferably 60 to 500 parts by weight per 100 parts by weight of component (A). If the amount of component (E) exceeds 1,000 parts by weight, the concentration of film-forming components is low, which is uneconomical. If the amount of component (E) is less than 40 parts by weight, the aqueous silicone dispersion is difficult to prepare or handle because of a higher viscosity.

The rubber film-forming silicone emulsion composition of the invention may further comprise a catalyst for promoting condensation reaction, which is selected from, for example, sodium compounds, aluminum compounds, potassium compounds, calcium compounds, vanadium compounds, iron compounds, cobalt compounds, nickel compounds, zinc compounds, zirconium compounds, and barium compounds. The amount of the catalyst blended may be 0.001 to 1 part by weight per 100 parts by weight of component (A).

It is noted that the rubber film-forming silicone emulsion composition of the invention does not contain organotin compounds.

In the rubber film-forming silicone emulsion composition, inorganic powders, pigments, dyes, thickeners, preservatives, antibacterial agents, deodorants, anti-rusting agents, antioxidants, defoamers, antistatic agents, UV absorbers, antifreezing agents, water-soluble resins, organic resin emulsions or the like may be added as long as the objects of the invention are not compromised.

The rubber film-forming silicone emulsion composition of the invention is prepared by adding the aminoalkyltrialkoxysilane as component (B) and the vinyltrialkoxysilane as component (C), with stirring, to an emulsion consisting of the organopolysiloxane as component (A), the surfactant as component (D), and water as component (E).

The emulsion consisting of the organopolysiloxane as component (A), the surfactant as component (D), and water as component (E) may be prepared by a method of emulsifying the organopolysiloxane as component (A) in water as component (E) with the aid of the surfactant as component (D), or a method of emulsifying a siloxane as a starting reactant to the organopolysiloxane as component (A) in water as component (E) with the aid of the surfactant as component (D) and then polymerizing the siloxane into the organopolysiloxane as component (A), i.e., the so-called emulsion polymerization method.

When the emulsion is prepared by the emulsion polymerization method, one procedure involves the steps of using as the siloxane or starting reactant to the organopolysiloxane (A), a cyclooligosiloxane having the formula: $[R^8_2SiO]_k$ wherein $R^8$ is as defined above and k is an integer of 3 to 7, if a linear structure is desired, or the cyclooligosiloxane and a trialkoxysilane having the formula: $R^8Si(OR^9)_3$ wherein $R^8$ and $R^9$ are as defined above or a tetraalkoxysilane having the formula: $Si(OR^{10})_4$ wherein $R^{10}$ is as defined above, if a branched structure is desired, dispersing and emulsifying the siloxane(s) in water as component (E) with the aid of a surfactant as component (D), polymerizing the siloxane(s) through equilibration reaction in the presence of an acidic catalyst or alkaline catalyst, and inactivating the catalyst, specifically by neutralizing the acid catalyst with an alkaline substance such as sodium hydroxide, potassium hydroxide, sodium carbonate, sodium hydrogencarbonate, triethanolamine, or triethylamine or the alkaline catalyst with an acidic substance such as hydrochloric acid, sulfuric acid, chlorosulfonic acid, phosphoric acid, boric acid, nitric acid, benzenesulfonic acid, methanesulfonic acid, trifluoromethanesulfonic acid or carboxylic acid. An alternative procedure involves the steps of using as the siloxane or starting reactant to the organopolysiloxane (A), an organopolysiloxane having the formula: $R^{11}O[R^8_2SiO]_lR^{11}$ wherein $R^8$ is as defined above, $R^{11}$ is hydrogen or a $C_1$-$C_6$ monovalent hydrocarbon group, and l is an integer of 1 to 1,000, if a linear structure is desired, or the organopolysiloxane and a trialkoxysilane having the formula: $R^8Si(OR^9)_3$ wherein $R^8$ and $R^9$ are as defined above or a tetraalkoxysilane having the formula: $Si(OR^{10})_4$ wherein $R^{10}$ is as defined above, if a branched structure is desired, dispersing and emulsifying the siloxane(s) in water as component (E) with the aid of a surfactant as component (D), polymerizing the siloxane(s) through equilibration reaction or condensation reaction in the presence of an acidic catalyst or alkaline catalyst, and inactivating the catalyst, specifically by neutralizing the acid catalyst with an alkaline substance such as sodium hydroxide, potassium hydroxide, sodium carbonate, sodium hydrogencarbonate, triethanolamine, or triethylamine or the alkaline catalyst with an acidic substance such as hydrochloric acid, sulfuric acid, chlorosulfonic acid, phosphoric acid, boric acid, nitric acid, benzenesulfonic acid, methanesulfonic acid, trifluoromethanesulfonic acid or carboxylic acid.

It is noted that $R^{11}$ is hydrogen or a $C_1$-$C_6$ monovalent hydrocarbon group, examples of which include alkyl groups such as methyl, ethyl, propyl, isopropyl, butyl, tert-butyl, pentyl and hexyl.

Examples of the acidic catalyst used in the above reaction include acid type surfactants such as alkylsulfuric acids, alkylbenzenesulfonic acids, and polyoxyethylene alkyl ether sulfuric acids, hydrochloric acid, sulfuric acid, chlorosulfonic acid, phosphoric acid, boric acid, nitric acid, benzenesulfonic acid, methanesulfonic acid, trifluoromethanesulfonic acid, and carboxylic acid. Examples of the alkaline catalyst include sodium hydroxide, potassium hydroxide, sodium carbonate, sodium hydrogencarbonate, triethanolamine, and triethylamine.

The acidic or alkaline catalyst may be used in such an amount as to provide the emulsion with pH 1 to 3 in the case of acidic catalyst, or the emulsion with pH 11 to 14 in the case of alkaline catalyst.

In the emulsion polymerization method, at least anionic or cationic surfactant is preferably used as the surfactant (D).

Notably, when an acid type surfactant such as alkylsulfuric acid, alkylbenzenesulfonic acid, or polyoxyethylene alkyl ether sulfuric acid is used as the acidic catalyst in the emulsion polymerization method, the surfactant has both an emulsifying ability and an acidic catalysis in that the acid type surfactant is neutralized with the neutralizing agent such as sodium carbonate and eventually becomes an anionic surfactant such as a sulfate or sulfonate salt. In this sense, the acid type surfactant can be the surfactant as component (D).

Emulsification may be performed on a conventional emulsifier/disperser. Examples of the emulsifier/disperser include a high speed rotation centrifugal radiation type agitator such as homo-disper, a high speed rotation shear type agitator such as homo-mixer, a high pressure injection type emulsifier/disperser such as pressure homogenizer, colloidal mill, and ultrasonic emulsifier.

The emulsion preferably has a volume average particle size of 100 to 10,000 nm, especially 150 to 1,000 nm as measured by a laser diffraction/scattering method particle size distribution measuring system.

Next, while the emulsion consisting of the organopolysiloxane as component (A), the surfactant as component (D), and water as component (E) is agitated, the aminoalkyltrialkoxysilane as component (B) and the vinyltrialkoxysilane as component (C) are added thereto. Desirably, the aminoalkyltrialkoxysilane as component (B) is previously mixed with and dissolved in the vinyltrialkoxysilane as component (C), the amount of component (C) being at least equal to, preferably at least twice the amount by weight of component (B), after which the mixed/dissolved liquid is added to the emulsion.

Notably, the entire amount of component (B) to be blended is mixed with and dissolved in component (C) prior to addition. As to component (C), the entire amount to be blended may be mixed with and dissolved in component (B) prior to addition. Alternatively, an equal or more amount of component (C) may be mixed with and dissolved in component (B) prior to addition, and the remainder of component (C) may be added singly.

It is noted that if component (B) is added singly, a gel can form in the emulsion. The reason is that the aminoalkyltrialkoxysilane as component (B) is so water-soluble that if component (B) is added singly to the emulsion, it is not dissolved in the organopolysiloxane as component (A), but in water as component (E), after which a gel is formed in water as condensation reaction of component (B) takes place. Therefore, component (B) must be used together with component (C). Since the vinyltrialkoxysilane as component (C) is low water-soluble, it is believed that component (C), when added to the emulsion, preferentially dissolves in the organopolysiloxane as component (A). Particularly when component (B) dissolved in component (C) is added to the emulsion, the majority of the dissolved liquid is dissolved in component (A) because the dissolved liquid is low water-soluble. This eliminates the risk of gel formation in water.

When components (B) and (C) are added to the emulsion consisting of the organopolysiloxane as component (A), the surfactant as component (D), and water as component (E), the dissolved liquid may be admitted all at once, or gradually in divided portions over time.

The emulsion consisting of the organopolysiloxane as component (A), the surfactant as component (D), and water as component (E) is agitated when the aminoalkyltrialkoxysilane as component (B) and the vinyltrialkoxysilane as component (C) are added thereto. The means for agitating the emulsion may be a conventional agitator having a propeller, flat impeller or the like. After addition, all the amount or a portion of components (B) and (C) is dissolved in component (A) while a fraction which is not dissolved therein is dispersed or dissolved in component (D).

After the rubber film-forming silicone emulsion composition of the invention is coated onto various materials and dried at room temperature (1 to 30° C.) or heat treated, a rubber elastic film is formed on the material. Film properties may be improved by further adding another aqueous ingredient or powder to the composition.

For coating the rubber film-forming silicone emulsion composition, any of well-known methods may be used in accordance with a particular type of substrate. When the coating step is followed by heat treatment, it is preferred to heat the coating at 50 to 300° C., especially 100 to 250° C. for 1 to 60 minutes, especially 1 to 10 minutes.

It is believed that the cure behavior of the inventive composition depends on the condensation catalytic ability of aminoalkyl groups in component (B) and the reactivity of aminoalkyltrialkoxysilane as component (B) and vinyltrialkoxysilane as component (C). Specifically, it is considered that condensation reaction first takes place between a terminal silicon-bonded hydroxyl group on the organopolysiloxane as component (A) and an alkoxy group on the aminoalkyltrialkoxysilane as component (B) having a condensation catalytic ability. Then, two alkoxy groups remaining on the aminoalkyltrialkoxysilane having condensed with one organopolysiloxane do not react with two alkoxy groups remaining on the aminoalkyltrialkoxysilane having condensed with another organopolysiloxane. The reason is that the reactivity therebetween is low due to the steric hindrance of the organopolysiloxane and the aminoalkyl group. If the vinyltrialkoxysilane as component (C) is available there, probably some of three alkoxy groups on the vinyltrialkoxysilane and some of two alkoxy groups remaining on the aminoalkyltrialkoxysilane having condensed with the organopolysiloxane undergo condensation reaction under the catalysis of aminoalkyl groups, forming the organopolysiloxane of crosslinked structure. This is probably due to the high reactivity of vinyltrialkoxysilane.

The rubber film-forming silicone emulsion composition of the invention finds applications, for example, damage protecting agent, water repellent, and release agent for paper sheets, plastic sheets and rubber articles, damage protecting agent, water repellent, water-proof agent, handle improver, and sealer for textiles, water repellent, water-proof agent, and release agent for concrete, mortar and wood.

EXAMPLES

Examples and Comparative Examples are given below for further illustrating the invention although the invention is not limited thereto. In Examples, the viscosity is measured at 25° C. by a rotational viscometer, and a concentration or content "%" is by weight.

Example 1

A 2-L glass beaker was charged with 948 g of octamethylcyclotetrasiloxane and 379 g of a 15% aqueous solution of dodecylbenzenesulfonic acid, which were stirred by a homomixer at 8,000 rpm. There was formed an oil-in-water emulsion with a viscosity buildup observed, and stirring was continued for a further 10 minutes. With stirring at 2,000 rpm, the emulsion was diluted by adding 569 g of water. The emulsion was passed through a homogenizer under pressure 100 MPa, yielding a uniform white emulsion.

The resulting emulsion, 948 g, was transferred to a 2-L volume glass flask equipped with an anchor type impeller agitator, thermometer and reflux condenser. The emulsion was heated at 70-75° C. in an oil bath, held at the temperature for 6 hours, cooled at 14-16° C. in a water bath, and held at the temperature for 12 hours, during which the siloxane was polymerized. Thereafter, 52 g of a 10% aqueous solution of sodium carbonate was added to the emulsion for neutralization, yielding an emulsion of linear dimethylpolysiloxane having hydroxyl groups bonded to silicon atoms at both ends of the molecular chain (hydroxyl-containing polysiloxane).

The hydroxyl-containing polysiloxane in the resulting emulsion has the following formula (5). After the emulsion was broken by adding isopropyl alcohol thereto, the hydroxyl-containing polysiloxane was taken out and analyzed, finding a viscosity of 2,100,000 mPa·s.

[Chem. 10]

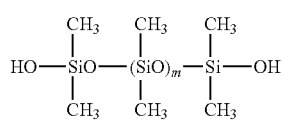

(5)

Herein m is such a number as to give the measured viscosity.

The hydroxyl-containing polysiloxane emulsion had a volume average particle size of 200 nm as measured by a laser diffraction/scattering particle size distribution analyzer LA-960 (Horiba, Ltd.).

The hydroxyl-containing polysiloxane emulsion, 500 g, was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.8 g (corresponding to 1.2 parts by weight per 100 parts by weight of the hydroxyl-containing polysiloxane), and vinyltriethoxysilane, 37 g (corresponding to 15.6 parts by weight per 100 parts by weight of the hydroxyl-containing polysiloxane), was added dropwise over 3 minutes. Agitation was continued for 1 hour, yielding a silicone emulsion.

After 48 hours from the preparation of the silicone emulsion, a ~2 g portion of the emulsion was placed in a dish and held at room temperature (25° C., the same hereinafter) for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Example 2

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.8 g (corresponding to 1.2 parts by weight per 100 parts by weight of the hydroxyl-containing polysiloxane), and vinyltriethoxysilane, 14.6 g (corresponding to 6.2 parts by weight per 100 parts by weight of the hydroxyl-containing polysiloxane), was added dropwise over 1 minute. Subsequently, vinyltriethoxysilane, 22.4 g (corresponding to 9.5 parts by weight per 100 parts by weight of the hydroxyl-containing polysiloxane), was added dropwise over 2 minutes. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Example 3

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.6 g (corresponding to 1.1 parts by weight per 100 parts by weight of the hydroxyl-containing polysiloxane), and vinyltriethoxysilane, 23.3 g (corresponding to 9.8 parts by weight per 100 parts by weight of the hydroxyl-containing polysiloxane), was fed. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Example 4

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.9 g (corresponding to 1.2 parts by weight per 100 parts by weight of the hydroxyl-containing polysiloxane), and vinyltriethoxysilane, 52.5 g (corresponding to 22.2 parts by weight per 100 parts by weight of the hydroxyl-containing polysiloxane), was added dropwise over 30 minutes. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Example 5

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 4.2 g (corresponding to 1.8 parts by weight per 100 parts by weight of the hydroxyl-containing polysiloxane), and vinyltriethoxysilane, 21.7 g (corresponding to 9.2 parts by weight per 100 parts by weight of the hydroxyl-containing polysiloxane), was fed. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Example 6

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.1 g (corresponding to 0.9 part by weight per 100 parts by weight of the hydroxyl-containing polysiloxane), and vinyltriethoxysilane, 23.9 g (corresponding to 10.1 parts by weight per 100 parts by weight of the hydroxyl-containing polysiloxane), was fed. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Example 7

A 2-L glass beaker was charged with 1,000 g of octamethylcyclotetrasiloxane and 3.6 g of phenyltriethoxysilane, which were agitated by a homo-mixer at 2,000 rpm. The beaker was further charged with 100 g of a 10% aqueous solution of sodium laurylsulfate, 100 g of a 10% aqueous solution of dodecylbenzenesulfonic acid, and 200 g of water, which were stirred by a homo-mixer at 8,000 rpm. There was formed an oil-in-water emulsion with a viscosity buildup observed, and agitation was continued for a further 10 minutes. With agitation at 2,000 rpm, the emulsion was diluted by adding 576 g of water. The emulsion was passed through a homogenizer under pressure 100 MPa, yielding a uniform white emulsion.

The resulting emulsion, 990 g, was transferred to a 2-L volume glass flask equipped with an anchor type impeller agitator, thermometer and reflux condenser. The emulsion was heated at 50-55° C. in an oil bath, held at the temperature for 16 hours, cooled at 14-16° C. in a water bath, and held at the temperature for 48 hours, during which the siloxane was polymerized. Thereafter, 10 g of a 10% aqueous solution of sodium carbonate was added to the emulsion for neutralization, yielding an emulsion of branched dimethylpolysiloxane having hydroxyl groups bonded to silicon atoms at molecular chain ends (hydroxyl-containing polysiloxane).

The hydroxyl-containing polysiloxane in the resulting emulsion has the following formula (6). After the emulsion was broken by adding isopropyl alcohol thereto, the hydroxyl-containing polysiloxane was taken out, and the viscosity of a 5% toluene solution of the polysiloxane measured 23 mPa·s.

[Chem. 11]

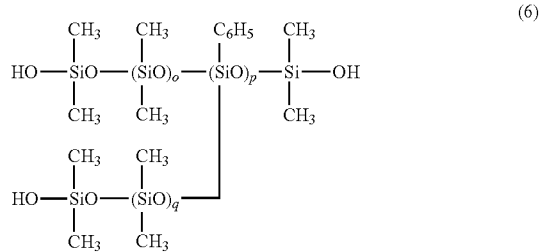

(6)

Herein o, p and q are such numbers as to give the measured viscosity and $(o+q):p=900:1$.

The hydroxyl-containing polysiloxane emulsion had a volume average particle size of 290 nm as measured by a laser diffraction/scattering particle size distribution analyzer LA-960 (Horiba, Ltd.).

500 g of the hydroxyl-containing polysiloxane emulsion was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 3.0 g (corresponding to 1.2 parts by weight per 100 parts by weight of the hydroxyl-containing polysiloxane), and vinyltriethoxysilane, 39 g (corresponding to 15.6 parts by weight per 100 parts by weight of the hydroxyl-containing polysiloxane), was added dropwise over 3 minutes. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. In a finger test, it was found to be a tack-free, elastic cured product. Also the emulsion was brush coated onto a rubber sheet and heat treated at 150° C. for 1 minute. In a finger test, the coated surface was found to be a tack-free cured film.

Comparative Example 1

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, vinyltriethoxysilane, 37 g (corresponding to 15.6 parts by weight per 100 parts by weight of the hydroxyl-containing polysiloxane), was added dropwise over 3 minutes. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off. The residue was liquid, indicating that the silicone remained uncured. Also the emulsion was brush coated onto a rubber sheet and heat treated at 150° C. for 1 minute. When the coated surface was examined by a finger test, the silicone remained uncured.

Comparative Example 2

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, aminopropyltriethoxysilane, 2.8 g (corresponding to 1.2 parts by weight per 100 parts by weight of the hydroxyl-containing polysiloxane), was fed. Agitation was continued for 1 hour, whereupon a gel-like mass formed.

Comparative Example 3

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.6 g (corresponding to 1.1 parts by weight per 100 parts by weight of the hydroxyl-containing polysiloxane), and methyltriethoxysilane, 23.3 g (corresponding to 9.8 parts by weight per 100 parts by weight of the hydroxyl-containing polysiloxane), was fed. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. It was a cured product which was elastic, but tacky in a finger test. Also the emulsion was brush coated onto a rubber sheet and heat treated at 150° C. for 1 minute. The coated surface was a cured film which was tacky in a finger test.

Comparative Example 4

500 g of the hydroxyl-containing polysiloxane emulsion prepared by the same procedure as in Example 1 was transferred to a 1-L volume glass flask equipped with an anchor type impeller agitator and thermometer where it was conditioned at 20-25° C. in a water bath. To the flask, a mixed/dissolved liquid of aminopropyltriethoxysilane, 2.6 g (corresponding to 1.1 parts by weight per 100 parts by weight of the hydroxyl-containing polysiloxane), and phenyltriethoxysilane, 23.3 g (corresponding to 9.8 parts by weight per 100 parts by weight of the hydroxyl-containing polysiloxane), was fed. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. It was a cured product which was elastic, but tacky in a finger test. Also the emulsion was brush coated onto a rubber sheet and heat treated at 150° C. for 1 minute. The coated surface was a cured film which was tacky in a finger test.

Comparative Example 5

A 1-L volume glass flask equipped with an agitator, thermometer and reflux condenser was charged with 108 g of maleic anhydride and 350 g of ethanol at 15-25° C. After they were uniformly dissolved, 242 g of aminopropyltriethoxysilane was added dropwise over 1 hour. After the completion of dropwise addition, agitation was continued at 80° C. for 1 hour to induce reaction, yielding a pale yellow clear ethanol solution of the reaction product of maleic anhydride and aminopropyltriethoxysilane.

500 g of the hydroxyl-containing polysiloxane emulsion prepared by the same procedure as in Example 7 was transferred to a 1-L volume glass flask equipped with an anchor type impeller agitator and thermometer where it was conditioned at 20-25° C. in a water bath. To the flask, a mixed/dissolved liquid of 36 g of water, 24 g of the ethanol solution of the reaction product of maleic anhydride and aminopropyltriethoxysilane, and 12 g of glycidoxypropyltrimethoxysilane was fed. Agitation was continued for 1 hour, yielding a silicone emulsion.

After 48 hours from the preparation of the silicone emulsion, a ~2 g portion of the emulsion was placed in a dish and held at room temperature for 24 hours, allowing water to volatilize off and leaving a solid matter. It was a cured product which was elastic, but tacky in a finger test. Also the emulsion was brush coated onto a rubber sheet and heat treated at 150° C. for 1 minute. The coated surface was a cured film which was tacky in a finger test.

The invention claimed is:

1. A rubber film-forming silicone emulsion composition comprising:
   (A) 100 parts by weight of an organopolysiloxane containing per molecule at least hydroxyl groups bonded to silicon atoms at molecular ends,
   (B) 0.1 to 5 parts by weight of an aminoalkyltriethoxysilane having the following formula:

(C) a vinyltriethoxysilane having, the following formula:

in an amount of 0.1 to 50 parts by weight which is at least equal to the amount of component (B),
   (D) 0.1 to 20 parts by weight of a surfactant, and
   (E) 40 to 1,000 parts by weight of water,
   the composition being free of organotin compounds.

2. The rubber film-forming silicone emulsion composition of claim 1 wherein component (B) is in the form of a mixed/dissolved liquid obtained by previously mixing and dissolving the entirety of component (B) in a portion or the entirety of component (C), the amount of component (C) being at least equal to the amount of component (B).

3. A method for preparing the rubber film-forming silicone emulsion composition according to claim 1, comprising the steps of:

mixing and dissolving the entire amount of (B) aminoalkyltrialkoxysilane having the following formula:

$H_2NC_3H_6Si(OC_2H_5)_3$ in an equal or more amount of (C) a vinyltriethoxysilane having the following formula:

$CH_2=CHSi(OC_2H_5)_3$ and with stirring, adding and mixing the mixed/dissolved liquid or the mixed/dissolved liquid and the remainder of component (C) if the mixed/dissolved liquid does not contain the entire amount of component (C), with an emulsion consisting of (A) an organopolysiloxane containing per molecule at least two hydroxyl groups bonded to silicon atoms at molecular ends, (D) a surfactant, and (E) water.

4. The method of claim 3 wherein the emulsion is obtained by emulsifying organopolysiloxane (A) in water (E) with the aid of surfactant (D), and with stirring, the mixed/dissolved liquid of aminoalkyltrialkoxysilane (B) and vinyltrialkoxysilane (C) or the mixed/dissolved liquid and the remainder of component (C) if the mixed/dissolved liquid does not contain the entire amount of component (C), are added to and mixed with the emulsion.

5. The method of claim 3 wherein the emulsion is obtained by emulsifying a siloxane as a starting reactant to organopolysiloxane (A) in water (E) with the aid of surfactant (D) and emulsion polymerizing the siloxane into organopolysiloxane (A), and with stirring, the mixed/dissolved liquid of aminoalkyltrialkoxysilane (B) and vinyltrialkoxysilane (C) or the mixed/dissolved liquid and the remainder of component (C) if the mixed/dissolved liquid does not contain the entire amount of component (C), are added to and mixed with the emulsion.

6. The method of claim 3 wherein component (B) is 0.1 to 5 parts by weight, component (C) is 0.1 to 50 parts by weight and at least equal to the amount of component (B), component (D) is 0.1 to 20 parts by weight, component (E) is 40 to 1,000 parts by weight, per 100 parts by eight of component (A), and the composition is free of organotin compounds.

7. The rubber film-forming silicone emulsion composition of claim 1, wherein the amount of component (B) is 0.5 to 3 parts by weight per 100 parts by weight of the organopolysiloxane as component (A).

8. The rubber film-forming silicone emulsion composition of claim 1, wherein the amount of component (C) is 0.2 to 50 parts by weight of the organopolysiloxane as component (A), and at least equal to the amount by weight of component (B).

9. The rubber film-forming silicone emulsion composition of claim 1, wherein the amount of component (C) is 0.5 to 30 parts by weight of the organopolysiloxane as component (A), and at least equal to the amount by weight of component (B).

10. The rubber film-forming silicone emulsion composition of claim 1, wherein the amount of component (C) is 0.2 to 50 parts by weight of the organopolysiloxane as component (A), and at least twice the amount by weight of component (B).

11. The rubber film-forming silicone emulsion composition of claim 1, wherein the amount of component (C) is 0.5 to 30 parts by weight of the organopolysiloxane as component (A), and at least twice the amount by weight of component (B).

* * * * *